United States Patent

[11] 3,557,864

[72] Inventor Leo Berg
Alstadten near Cologne, Germany

[21] Appl. No. 780,758
[22] Filed Dec. 3, 1968
[45] Patented Jan. 26, 1971
[73] Assignee Knapsack Aktiengesellschaft
Knapsack near Cologne, Germany
a corporation of Germany
[32] Priority Dec. 20, 1967
[33] Germany
[31] 1,729,232

[54] APPARATUS FOR THE PRODUCTION OF GRANULAR SOLIDS FROM DILUTE SOLUTIONS OR SUSPENSIONS
4 Claims, 1 Drawing Fig.

[52] U.S. Cl. ........................................................ 159/4, 23/165
[51] Int. Cl. ........................................................ B01d 1/16
[50] Field of Search .............................................. 159/4A, 48, 16A, 4(MS), 4(VMS), 45; 23/165, D

[56] References Cited
UNITED STATES PATENTS

| | | | |
|---|---|---|---|
| 1,491,486 | 4/1924 | Marguard et al. ............ | 159/4A |
| 2,056,266 | 10/1936 | Goodell ........................ | 159/4AX |
| 2,590,905 | 4/1952 | Tomlinson et al. ........... | 159/4A |
| 3,212,235 | 10/1965 | Markant ....................... | 159/4AX |
| 3,276,510 | 10/1966 | Austin et al. .................. | 159/16A |

*Primary Examiner*—Norman Yudkoff
*Assistant Examiner*—J. Sofer
*Attorney*—Connolly and Hutz

ABSTRACT: Apparatus for the production of granular solids from dilute solutions or suspensions, in which the solids are dissolved by concentrating or thickening them by means of a heat carrier in a vaporization zone so as to obtain a concentrate, precipitating the solid, and atomizing the concentrate in a spray zone wherein the gas issuing from the spray zone is used as the heat carrier in the vaporization zone.

PATENTED JAN 26 1971
3,557,864
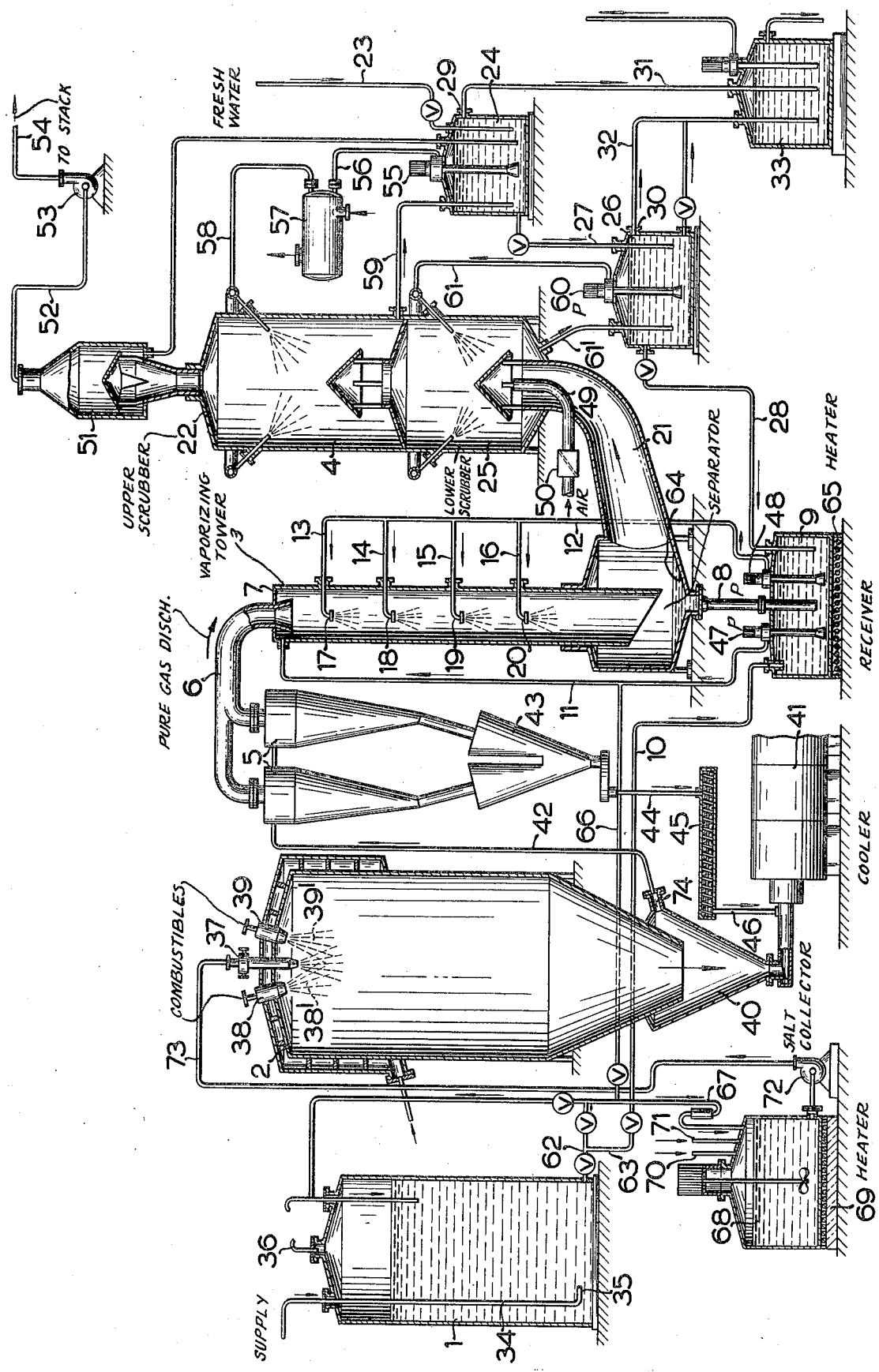

APPARATUS FOR THE PRODUCTION OF GRANULAR SOLIDS FROM DILUTE SOLUTIONS OR SUSPENSIONS

The present invention relates to a process and an apparatus for the production of granular solids, particularly salts, from dilute solutions in which the solids are dissolved, particularly salt solutions, by concentrating or thickening them by means of a heat carrier is a vaporization zone so as to obtain a concentrate, precipitating the solid, and atomizing the concentrate in a spray zone.

An earlier process of the type described above comprises supplying the dilute solution to a vacuum evaporator via a preheater and a check valve device. The evaporator base portion receives the dilute solution and the evaporator top portion is charged with steam, which can be expanded in an associated expansion chamber. The vacuum evaporator base portion receiving the dilute solution has an associated branch line for removal of concentrated matter connected thereto. Superheated steam, which can also be expanded in the expansion chamber is used to heat the dilute solution in the vacuum evaporator. However, the process so far described is not fully satisfactory bearing in mind that it is required to be carried out under vacuum using pumps, a condenser and a cooling installation, whereby it is rendered costly and rather susceptible to disturbances, particularly with respect to the vacuum pumps. In addition, a separate heating source, i.e. steam generation facilities, is needed for carrying out the above process, whose economy is greatly affected by the high costs of energy.

The object of the present invention is to provide a process and apparatus for the production of granular solids from dilute solutions, in which the solid are dissolved, process and apparatus which are free from the disadvantages effects reported above and combine high efficiency with fairly low operational costs. This is achieved by the process of the present invention, wherein gas issuing from the spray zone is used as the heat carrier, i.e. as the agent supplying heat to the vaporization zone. In this manner, it is possible to arrive at a process of the type described above, which, however, makes economic use of the heat potential inherent to the gases issuing from the spray tower, needs no separate steam generation facilities and, therefore, incurs considerably reduced operational costs and considerably less expenditure with respect to apparatus.

In accordance with a further feature of the present invention, gas issuing from the vaporization zone and partially charged with particles originating from the solution, is scrubbed in a scrubbing zone by means of a circulated scrubbing liquid, prior to conveying the scrubbing liquid to the vaporization zone. This enables the issuing gas to be freed from the above solution particles which are returned later to the concentration cycle to avoid any loss of residual solution particles contained in the issuing gas.

The invention also provides for the gas issuing from the vaporization zone to be scrubbed further in one or more further scrubbing zones, whereby it is possible to purify the issuing gas as extensively as desirable. Dilute solution issuing through the overflow of the said further scrubbing zones is no longer supplied to the concentrate but used in a different manner.

The reservoir zones receiving the resulting concentrate should be conveniently heatable in order effectively to prevent the concentrate from solidifying or crystallizing out therein.

The present invention also relates to an apparatus for carrying out the present process, the apparatus substantially comprising a dilute solution reservoir, a vaporization tower for concentrating the dilute solution, a spray tower for atomizing concentrate, and an off-gas purification means. The gas issuing from the spray tower is purified by means of a dust removal means, which is disposed downstream of the spray tower with respect to flowing gas, and between the spray tower and the vaporization tower, the pure gas discharge line of the dust removal means being arranged so as to project into the upper end of the vaporization tower. This enables the supply of substantially purified gas to the vaporization tower.

In accordance with a further feature of the present invention, the separator of the vaporization tower is arranged continuously to communicate with a receiver which has an associated feed line for the supply of dilute solution coming from the reservoir and a number of pipelines connecting the receiver to the vaporization tower. In this manner, it is possible to design an apparatus of the type described above which, however, needs no vacuum pumps, which are so sensitive to disturbances, and therefore combines great simplicity with unsusceptibility to disturbances under usually heavy, commercial working conditions. The present apparatus offers the further advantage of combining relatively small overall dimensions with relatively low construction costs.

In accordance with a still further feature of the present invention one of the pipelines is arranged to project substantially tangentially into the upper end of the vaporization tower and the other pipeline is subdivided into a number of branch pipes running to a plurality of nozzles, which are arranged on and along the center axis of the vaporization tower. In other words a relatively low number of pipes is needed for the cycles between the receiver and vaporization tower.

The present apparatus also provides for solution issuing through the first of the above pipelines to be conveyed helically along the inside wall of the vaporization tower, and for solution issuing through the branch pipes to be delivered to the nozzles for injection into the heat carrier. By the helical introduction of the solution into the upper end of the vaporization tower, it is possible to make a solution film flow over or trickle down the inside wall of the vaporization tower. This enables contaminants i.e. deposited solid material, to be washed away and cloggings inside the vaporization tower to be obviated, so that the apparatus needs practically no control or maintenance work. As mentioned above, the solution is injected into to the heat carrier whereby the two components at are intimately mixed with one another. This is accompanied by good heat transfer from the heat carrier to the solution and by good thickening or concentration effects.

It is also advantageous to arrange the vaporization tower's discharge line so as to project into a scrubbing tower which preferably comprises two scrubbing zones, of which the upper scrubbing zone has arranged directly in front of it an upper scrubbing liquid receiver with a lockable fresh scrubbing liquid feed line, and of which the lower lower scrubbing zone has an associated lower scrubbing liquid receiver communicating through lockable pipelines firstly with the upper scrubbing liquid receiver and secondly with the receiver of the vaporization tower. This arrangement enables all solution particles which may still appear in the issuing gas to be readily recovered.

The scrubbing liquid receivers can be formed with overflows which are arranged so as to project into a hot water container, and enable the reflux of scrubbing liquid into the container receiving the concentrated solution to be regulated by conveying a partial stream of scrubbing liquid to the hot water container. The process described above can be used with particular advantage for the production of alkali metal phosphates, especially alkali metal polyphosphates, from aqueous alkali metal phosphate solutions, such as those which are obtained by conventional wet-processing of crude phosphates, after neutralization, The above alkali metal phosphates and polyphosphates include sodium phosphates or sodium tripolyphosphates.

As shown in the accompanying drawing, the apparatus of the present invention for the production of granular solids from dilute solutions in which the solids are dissolved substantially comprises a reservoir 1 for dilute solution, a spray tower 2 for precipitating the solid from the concentrate, a vaporization tower 3 for concentrating the dilute solution, a dust removal means 5 for mechanical purification of gas issuing from the spray tower, the pure gas discharge line 6 of the dust removal means 5 being arranged so as to project into the upper end 7 of vaporization tower 3. The dust removal means 5 is disposed downstream of the spray tower 2 with respect to the flowing gas, and between said tower and vaporization tower 3. The separator of vaporization tower 3 is further connected through line 8 to receiver 9 of the vaporization tower, receiver 9 being connected to dilute solution reservoir 1, by means of line 10, and to vaporization tower 3, through pipelines 11 and 12.

Pipeline 11 is arranged so as to project substantially tangentially into the upper end 7 of vaporization tower 3, whereas pipeline 12 is subdivided into a number of branch pipes 13, 14, 15, 16 running to nozzles 17, 18, 19, 20, which are arranged on and along the center axis of vaporization tower 3. Solution traveling through pipeline 11 flows helically along the vaporization tower's inside wall, and dilute solution flowing through branch pipes 13, 14, 15, 16 is delivered to nozzles 17, 18, 19, 20 to be injected into the heat carrier.

The vaporization tower's discharge line 21 is arranged to project into a scrubbing tower 4, which preferably comprises two scrubbing zones, of which the upper scrubbing zone 22 has arranged directly in front of it an upper scrubbing liquid receiver 24 with a lockable, fresh scrubbing liquid feed line 23, and of which the lower scrubbing zone 25 has an associated lower scrubbing liquid receiver 26 communicating through lockable pipelines 27 and 28 firstly with the upper scrubbing liquid receiver 24 and secondly with receiver 9 of the vaporization tower. The scrubbing liquid receivers 24 and 26 are formed with overflows 29 and 30 which project into hot water container 33, through pipelines 31 and 32.

Dilute solution reservoir 1 has an associated supply line 34, which is extended approximately down to the bottom of the reservoir and carries an elbow 35 at its lower end, which protects the reservoir bottom, upon the introduction of dilute solution. Exhauster 36 is used to prevent any overpressure or subpressure from forming inside reservoir 1.

The upper end of spray tower 2 is formed with a supply inlet 37 for injecting concentrate into it and with two or more combustion gas feed lines 38 and 39, which are arranged so as to be spaced from inlet 37. The lower end of spray tower 2 is formed with a collecting tank 40 which has an associated cooler 41 for the resulting salt.

A pipeline 42 is arranged to run from the upper end of collecting tank 40 to dust removal means 5 which in turn is arranged to project into a further collecting tank 43, from where precipitated dust, i.e. precipitated salt, is delivered through line 44 worm conveyor 45 and line 46 to salt cooler 41.

Two immersion pumps 47 and 48 are used for circulating the dilute solution from receiver 9 of the vaporization tower through pipelines 11 and 12 to vaporization tower 3 and back to receiver 9, through connecting line 8.

The gas discharge line 21 of the vaporization tower and a further line 49 with a flap valve 50 for the supply of secondary air are arranged so as to project into the bottom portion of gas purifier 4. In gas purifier 4, the gas is freed from solution particles contained in it to be conveyed later to drip tube 51, from where it travels further through line 52, blower 53 and line 54 to an exhaust gas chimney (not shown in the drawing).

Immersion pump 55 is used to convey the fluid solution from the upper scrubbing liquid receiver 24 through pipeline 56, heat exchanger 57 and a further pipeline 58 to the upper scrubbing zone 22 of gas purifier 4, from where precipitated particles are returned through pipeline 59 back to the upper scrubbing liquid receiver 24. Similar conditions prevail in the lower scrubbing zone. Immersion pump 60 conveys the dilute solution from the lower scrubbing liquid receiver 26 through line 61 to the lower scrubbing zone 25 of gas purifier 4, from where precipitated particles are returned through line 61 back to the lower scrubbing liquid receiver 26. The upper scrubbing liquid receiver 24 has a fresh water supply line 23 associated therewith and is connected to the lower scrubbing liquid receiver, by mean of a lockable pipeline 27. A further lockable pipeline 28 is arranged between the lower scrubbing liquid receiver 26 and receiver 9 of the vaporization tower.

The apparatus of the present invention for the production of granular solids from dilute solutions in which the solids are dissolved is operated in the following manner: Dilute fluid solution coming from reservoir 1 travels through pipelines 62 and 63 to receiver 9 of the vaporization tower to be conveyed later, by means of immersion pumps 47 and 48 and through pipelines 11 and 12, to vaporization tower 3. Concentrate which forms therein is collected in collecting tank 64 and returned through line 8 back to receiver 9 of the vaporization tower. Receiver 9 can be heated by means of heater 65 to avoid solidification, e.g. precipitation of concentrate. The concentrate accumulating in receiver 9 is conveyed by means of immersion pumps and through pipelines 11, 66 and 67 to suspension container 68 which can be heated by means of heater 69 to avoid solidification, e.g. precipitation of concentrate. The suspension can be mixed with further addends, e.g. NaOH and $H_3PO_4$, which are introduced through lines 70 and 71. Immersion pump 72 is used to convey the concentrate through line 73 to spraying means 37 with the aid of which it is finely atomized. Water which is liberated on atomizing the concentrate is simultaneously vaporized by means of flames 38' and 39'. The salt precipitates and is collected in container 40 to be conveyed later to salt cooler 41. The combustion gases leave container 40 through outlet opening 74. They are conveyed through line 42 to dust removal means 5. Salt-free gas leaves dust removal means 5 through pure gas discharge line 6, travels to vaporization tower 3, leaves the latter through gas discharge line 21 and is finally purified in gas purifier 4. The purified gas is finally allowed to escape through the exhaust gas chimney into the atmosphere.

EXAMPLE (The data indicated below are referred to 1 kg. water vaporized in the spray tower).

2.4 kg. sodium phosphate solution containing 45 percent solid matter were continuously conveyed via pipe 10 from reservoir 1 to receiver 9, which was partially filled with concentrated matter with a solid matter content of 51.8 percent. 11 kg. concentrated matter were supplied through pipeline 11 and a further 13.08 kg. concentrated matter were supplied through pipeline 12 to vaporization tower 3. 2.08 kg. concentrated matter were pumped through pipelines 11, 66, and 67, to suspension container 68 and conveyed later through pipeline 73 to spray tower 2 to be atomized therein. In spray tower 2 there was obtained 1.08 kg. sodium tripolyphosphate which was introduced into salt cooler 41. 3.41 kg. of issuing gas, which has a temperature of 350° C., were purified in dust removal means 5 and conveyed to a vaporization tower 3. The gas left tower 3 at a temperature of 91° C. to travel through the scrubbing installation 4 to the off-gas chimney. 25 percent of the total quantity of salt produced were withdrawn from the issuing gas in dust removal means 5. The hot issuing gas was found to withdraw 0.5 kg. water from the sodium phosphate solution, in vaporization tower 3.

I claim:
1. An apparatus for the production of granular solids from dilute solutions, comprising a solution receiver; dilute solution supply means connected to said solution receiver; a vaporization tower having an upper end for concentrating the dilute solution, the solution receiver being arranged below the vaporization tower for collecting concentrated solution therefrom; a spray tower for atomizing the concentrated solution, conduit means connecting the solution receiver to the spray tower to supply solution for atomization therein; gas conduit means connecting the spray tower to the vaporization tower including an off-gas purifier between the spray tower and the vaporization tower for purifying off-gas issuing from the spray tower; a pure gas discharge line connected to the off-gas purifier, the pure gas discharge line being arranged so as to project into the upper end of the vaporization tower; a separator connected to the lower end of the vaporization tower and being connected so as to continuously communicate with the solution receiver to discharge concentrated solution therein; a scrubbing tower connected to the separator by a gas discharge line for scrubbing the gas issuing from the separator; the solution receiver having two pipelines connecting it to the vaporization tower, the first pipeline being arranged to project substantially tangentially into the upper end of he the vaporization tower and the second pipeline being subdivided into a number of branch pipes running to nozzles, which are arranged on and along the center axis of the vaporization tower.

2. The apparatus of claim 1, wherein said first pipeline provides means for discharging dilute solution issuing through the first pipeline helically along the inside wall of the vaporization tower, and said second pipeline provides means for delivering dilute solution issuing through the branch pipes to the nozzles for injection into the vaporization tower.

3. The apparatus of claim 1, wherein the separator's gas discharge line is arranged so as to project into the scrubbing tower comprising two scrubbing zones, of which the upper scrubbing zone has arranged upstream of it with respect to gas flow an upper scrubbing liquid receiver, a fresh scrubbing liquid feed line connecting the upper scrubbing liquid receiver with the upper scrubbing zone for providing scrubbing liquid thereto, and of which the lower scrubbing zone has an associated lower scrubbing liquid receiver, communicating through valve pipelines firstly with the upper scrubbing liquid receiver and secondly with the solution receiver below the vaporization tower.

4. 4 The apparatus of claim 3 wherein a hot water container is provided, and the scrubbing liquid receivers are equipped with overflows which are arranged so as to project into the hot water container.